UNITED STATES PATENT OFFICE 2,148,040

METHOD OF MANUFACTURING COMPOSITE MATERIALS AND SHAPED BODIES THEREOF

Paul Schwarzkopf, Reutte, Austria

No Drawing. Application November 24, 1936, Serial No. 112,507. In Germany July 13, 1936

8 Claims. (Cl. 29—188)

This invention relates to a method of manufacturing composite material and shaped bodies thereof. In particular, the invention relates to material consisting of at least two substances different in melting point. This invention is a continuation in part of my copending application Ser. No. 681,397, filed July 20, 1933, which is in turn a continuation in part of my then copending application Ser. No. 594,154, filed February 19, 1932, and issued into Patent 2,030,229.

The substance of different melting points may consist of metals or metalloids, and of compounds of any desired and suitable nature.

Thus, the material of higher melting point may consist of tungsten, molybdenum, tantalum, whereas the material of lower melting point consists of copper, silver, gold, aluminum, platinum, lead, tin, zinc, cobalt, nickel, chromium, vanadium, zirconium, cadmium and titanium.

The higher melting material may also consist of carbide of any element, but in particular of refractory and wear- or corrosion-resisting carbide, such as tungsten carbide, molybdenum carbide, chromium carbide, vanadium carbide, tantalum carbide, columbium carbide, titanium carbide, silicon carbide, boron carbide, whereas the lower melting material may consist of tungsten, molybdenum, titanium, vanadium, tantalum, cobalt, nickel, iron, copper, chromium, tin, aluminum, and alloys having a lower melting point than the selected carbide.

Furthermore the higher melting material may consist of metalloids, such as carbon in any desired form, e. g. graphite, or silicon, whereas the low melting material may consist of aluminum, brass, metal of the iron group.

It is to be understood that these various groups are only enumerated by way of example and that the invention is by no means limited thereto.

The higher and lower melting material may be present in any suitable ratio which cannot be given in general, because it depends upon the specific weight of the materials to be mixed, and the intended use. Tungsten is a very heavy metal and occupies therefore a very small volume. If it is desired to agglomerate tungsten with aluminum which is a very light material and therefore occupies relatively extensive space, it is obvious that a very small amount by weight of aluminum suffices to agglomerate the tungsten. In general, therefore, the higher melting material may be used in amounts between about 10% to 97% of the final body to be obtained.

According to this invention the material to be agglomerated is reduced to a fine powder. The degree of fineness depends upon the homogeneity desired or necessary for the intended use.

If the material is not present in powder form, it might be obtained by precipitation from a solution thereof, or it is to be comminuted by proper mechanical means such as ball mills. Dry or wet grinding may be applied for some hours or days, as the case may be, depending upon the hardness and strength of the material to be comminuted and the degree of fineness desired. In order to avoid the bringing of impurities into the material during comminuting, the apparatuses may be made of the same material or lined therewith. If a mixture of materials is going to be comminuted, the walls or lining may substantially consist either of one, or some, or all of the components, in the last cases preferably in about the same ratio, as intended for the final mixture.

The material so comminuted may either be somewhat and somehow compacted and then submitted to a final agglomeration step, or it may immediately be subjected to the latter one. In particular, as I suggested in my above mentioned application, Ser. No. 594,154, the mixture may be compounded in the hot state and/or under pressure whereby at least one of the components retains its state of aggregation. As I stated in my copending application, Ser. No. 681,397, a mixture of at least two metals one of which is higher melting or harder and the other is lower melting or softer, is conglomerated in the hot state and/or under pressure whereby no chemical combination or complete alloy formation occurs between the several elements, but a solid mixture or conglomerate body is obtained.

In the first case a coherent body of the mixture is formed by pressing the mixture and fritting or presintering it in a suitable atmosphere which may be the surrounding air, if this does not attack, or does not change the material contained in the mixture in an undesired way, or which may be any protective atmosphere such as hydrogen. The temperature at which presintering or fritting is performed depends upon the nature of the mixture. In any case, however, temperatures are to be avoided at which the high melting material present in the mixture would be highly sintered or melted. In other words, only the low melting material may be caused to frit or sinter, or to melt, but only to such a degree that no dense and finely sintered body is obtained of according strength. Presintering or fritting temperatures answering this invention may in general lie at about 10% to 30% below high sintering temperature which in turn lies, in general, about 10% to 15% below the melting point of the entire mixture. The fritted or presintered body will, in general, have a spongy and porous structure.

Taking for instance a mixture of tungsten and copper in which the copper forms between about 10% to 30% of the mixture, the mixture would first be pressed, for instance in a hydraulic press, so that a somewhat coherent body results which is then heated up to about 800° C. to 900° C. for a time which depends upon the volume and therefore upon the heat capacity of the body and may be from 10 to 15 minutes to about two hours, or more, whereby the fritted or presintered body results. This body is now introduced, preferably while it is still hot, into an extrusion press and subjected to high pressure up to several thousand kilograms per sq. cm. Depending upon the amount of lower melting metal present, of its nature, and furthermore, on the size of the orifice through which the material is going to be pressed out of the extrusion press, the pressure to be exercised will vary between several 100 kilograms up to many thousand of kilograms. No upper limit can be given although generally about 5000 to 15,000 kilograms per sq. cm. will not be exceeded.

Taking the example given above, the fritted or presintered tungsten-copper body could be extruded by applying a pressure between about 2000 to 5000 kilograms per sq. cm. By subjecting the mixture of materials of different melting points to a heat treatment before subjecting it to pressure in the extrusion press, the volume of the mixture is substantially reduced and the interstices between the particles of the mixture decreased and partly removed. The lower, or lowest melting material present will at least soften and thereby better conform with the shape of the other particles of higher melting material present whereby the reduction of the volume of the mixture is easily to be explained. If the lower melting material is melted, the effect just described further increases, and a kind of fritting of the mixture to a coherent mass is achieved. By still further raising the temperature, a presintered product may be obtained.

By subjecting the powdery mixture to pressure before heating it, a reduction of the volume of the mixture is again obtained which facilitates the subsequent thermal and mechanical treatment. If such pressed mixture is heated afterwards a more dense body of still further reduced volume is obtained. If a somewhat coherent body is obtained by applying heat and preferably pressure too, various advantages are obtained.

First of all, a body greatly reduced in volume is subjected to pressure in the extrusion press. There can further be used a simple spindle press in which the coherent body is inserted and then pressed through an orifice of selected shape. Such a coherent, somewhat fritted or even presintered body may then consist of particles the specific weight of which more or less, and, in particular, greatly differs. Whereas segregation of the particles of such powdery and loose mixtures easily occurs and renders the distribution of the particles in the compacted body unequal, by application of a shaping pressure and heat up to fritting or presintering temperature, preferably while pressure is still applied, segregation of the particles is prevented and a coherent body is obtained with uniform and equal distribution of its components. Such body may be handled in any desired way. It may be inserted in the extrusion press, preferably while still hot, or it may be permitted to cool, and either be put in storage, or transported to any other place where its further handling in an extrusion press has to be performed. It will always be of the same consistency, and the body made therefrom through the extrusion press will be of the same quality.

Furthermore there may be made a body of a certain mixture or even a single substance, such as steel or iron. In the first case the mixture may be pressed and fritted or presintered. In the last case, either the powder of the material may be pressed, fritted, or presintered, or even a cast or highly sintered body be taken. Such a body may then be inserted like a core in a mould, and surrounded by a powdery mixture of selected constituents, the powder pressed around the core and then fritted or presintered, so that a body is obtained consisting of a core and a surrounding part. Thus, the core may consist of a cylinder of iron or steel, around which a hollow and tightly fitting cylinder is made of a mixture of bronze and graphite, or of carbide and about 3 to 40% auxiliary metal, or of nitrides and about 3 to 40% auxiliary metal, or of any other composition which is either resistant to chemical or mechanical wear and corrosion. This initial composite body is then inserted into the extrusion press, so that, for instance, a rod is obtained consisting of an inner iron or steel core, surrounded by a graphite containing metal, or a hard alloy, or a non-rusting (stainless) steel composition. Instead of a rod a hollow tube may be pressed by inserting a mandrel into the aperture of the extrusion press. Instead of using iron, steel, or other metal or alloy as a core, one may use a mixture in a fritted or presintered form as a core and surround it with iron, steel, or any other substance, and then subject the initial composite body again to the treatment in the extrusion press. Thus, for instance, bearings may be produced consisting of an iron or steel ring, and inside of this, a ringlike layer of mixed metal and graphite evenly distributed therein, said layer tightly adhering to the outer ring.

It is obvious that in this way final composite bodies may be obtained in a cheap and reliable process, adapted for mass production in which mixtures are used which are relatively difficult to handle and to unite with other bodies.

Introducing the initial composite body into the extrusion press in a hot state has the particular advantage that the pressure to be applied may be kept lower, and the time until the body yields and starts to extrude is substantially shortened also. However, the general views explained hereinbefore are to be taken care of in determining the temperature at which the composite body is to be extruded. This temperature has to be below that at which the lowest melting metal, or the lowest melting alloy present in the mixture would melt or flow.

In preparing the initial composite body consisting for instance of two parts one of which is formed by a mixture to be compacted according to this invention, one may proceed in different ways.

One way consists in using a highly sintered or cast or otherwise shaped body as a support, core or cover for the first part consisting in the mixture to be compacted and connected with said body. The second part may be a rod, plate, cylinder or the like which ought not to change its shape in the extrusion press, and therefore travels with the mixture forming the first part and covering a portion or all of the second part, through the aperture of the press without changing its shape. If the second part acts as a core, the mixture entirely or partly surrounding the core is compacted and firmly connected with the core when extruded. If the second part acts as a cover, the compacting of the mixture can be effected by means of a mandrel arranged in the aperture of the press which is pressed into the mixture while it is extruded and travels with and inside the second part through the aperture.

The other way consists therein that both parts are to alter their shapes when extruded. To this end, the second part has to be prepared in such a way that it is still capable of changing its shape when extruded together with the first part (consisting in the mixture to be compacted). To this effect for instance powdered iron, steel or other material selected for the core or cover may be fritted or presintered so as to result in a body which can be deformed in an extrusion press, particularly at elevated temperature. Thereupon this body is either covered or filled with a mixture according to this invention, and advantageously the latter is connected with the core or cover by fritting or presintering the mixture on it. Thereby an initial composite body is obtained which is deformed as a whole when extruded. Assuming for the sake of simplicity that a cylindrical core is covered by a mixture according to this invention forming a collar around it, this initial composite body will result in a final composite body after extrusion which again consists of an inner cylindrical core and a collar tightly and firmly surrounding it, the diameters of which are proportionally reduced as a result of the extrusion procedure.

In the following some further results and advantages of my invention may be described with reference to the extruded and thereby compacted mixture alone, although it equally refers to the manufacture of any composite material and body.

The mixture so treated may consist of components which are not capable of alloying at all, or which may alloy in part, or sometimes alloy substantially.

It is advantageous, but not necessary, to impart to the fritted or presintered body a shape similar to that into which it is finally to be transformed by the extrusion press. Thus, the body may be cylindrical, if an aperture of circular cross-section is provided for the extrusion press, and it may be of a cross-section different from a circular one, if the aperture of the press has such a cross-section.

By the extrusion press, the originally porous body is rendered dense to such a degree that it is practically free from any pores, thereby highly resistive to attacks from the surrounding atmosphere, of high mechanical strength and, if at all, of improved electrical and thermal conductivity.

The extruded body may form the desired final product, or it may be subdivided by shearing or cutting immediately upon leaving the aperture of the press, or it may be pressed into a mould which it enters while still hot, or at least pliable, or in which it is reheated and/or subjected to high pressure in order to get the desired final or temporarily final shape.

Taking, for instance, a fritted or presintered cylindrical initial body of given cross-section, the latter has to be reduced to preferably at least half, or a smaller fraction down to one quarter and less, when the body is pressed through a circular aperture of the extrusion press. In other words, the cross-section of this aperture has to be one half of the inserted coherent body or essentially smaller than that, in order to achieve a dense and non-porous body free from undesired enclosures of air and gases.

If desired, there may be maintained a neutral atmosphere or a vacuum within the extrusion press during operation, in order to avoid any attack upon or conversions of the initial body inserted therein, or in order to prevent the intrusion of undesired gases into the porous fritted warm or hot, sometimes redhot bodies. In particular undesired oxidations can be prevented thereby.

The extruded body may be subjected to any metallurgical treatments, in particular thermal and mechanical treatments. With thermal treatments, temperatures up to about 50% to 60% of the sintering temperature of the body or of the melting point of the lowest melting metal or component present in the body are preferably not to be exceeded. Such treatments may be applied in order to affect the hardness or structure of the body, or in order to obtain other desired effects. Mechanical treatments such as hammering, rolling, forging, boring and turning may be applied in order to shape the bodies further.

Instead of preforming the mixture into a somewhat coherent body by fritting or presintering, the mixture may immediately be introduced into the extrusion press and subjected to high pressure. The initial pressure to be applied upon the mixture will generally be somewhat higher than the one to be exerted upon a fritted or sintered body, in particular if it is introduced in a hot state. However, after extrusion once has started, the pressure drops materially, and extrusion can be continued at substantially lower pressure.

Taking again the case of tungsten and copper in the porportion mentioned above, the initial pressure may be increased up to about 20% to 50% until the mixture starts to flow through the extrusion aperture.

The inventor does not want to limit himself to any explanation of his invention. Careful observations made it feasible, however, that the following may happen during the extrusion procedure.

By compressing the mixture the lowest melting metal present finally yields and consequently starts to flow. It fills at first all interstices between the still solid particles of the other components of the mixture and covers them, and then it flows together with the other particles through the aperture of the extrusion press. There the pressure ceases immediately, and the extruded portion solidifies. It has been observed that material heat is developed during the extrusion process. If a powdery mixture is pressed, dammings are caused, both near the extrusion aperture and the place where the pressure is applied. In other words, the conditions somewhat differ from those in a liquid or in a solid body. Therefore, near the plunger of the press and its aperture, due to the substantially increased pressure, the lower melting metal will be heated until after it yields and starts to flow around the higher melting particles present. The heat developed in these portions of the mixture is imparted by conduction to adjacent inner portions of the mixture. Now, the portion in front of the aperture starts to flow through the latter, and the next portion of the mixture somewhat preheated by the first extruded portion, approaches the aperture. The heating of this portion up to a degree where the lower melting metal present therein yields and starts to flow, is easier and needs less time and heat and therefore even lower pressure. In such a way, if the extrusion is performed with a certain speed to be ascertained by a few experiments, one may arrive at a continuous process by which even a mixture can be extruded through an aperture of the press and immediately transformed and compacted into the desired dense string body. Thereby it is also explained that at first, if pressing of the mixture just starts, a relatively high pressure is to be exercised which falls, however, when the mixture starts to extrude through the aperture. Also in this case the same mixture may be subjected to extrusion pressing, and the same treatments may be applied, after the mixture has left the aperture of the press, as mentioned above. All mixtures resulting in more or less precious metals may be compacted in this way, such as hard metal mixtures containing hard and wear-resisting carbides together with auxiliary metal preferably of the iron group. Thereby the auxiliary metal may be present in amounts of between 3% and 40%, depending upon the specific weight of the carbide selected. In the same way nitrides of elements of the third to sixth and eighth group of the periodical system may be comminuted and worked with auxiliary metal, and in particular surface hardening may be performed thereby. The bodies the surface of which are to be hardened or otherwise entirely or partly covered can be inserted like a mandrel into the aperture of the press and extend into the interior of it, then be covered with the desired mixture within the press whereupon pressure is applied, and when the mixture starts to flow around the mandrel, the latter is moved through and out of the aperture with exactly the same speed as the mixture extrudes. Thereby the latter is tightly and thoroughly connected with the mandrel which may be a tool shank, a plate or band of steel, iron, or any other desired material, and of any desired shape, such as circular or rectangular. The body to be covered entirely or in part, for instance on one side or two opposite sides only, may also be heated e. g. electrically, before inserting it into the press or while being in it, to about the same temperature as the mixture is heated by the pressure applied thereto. In order to reduce the initial pressure and the time of applying it, the mixture may be heated in the press by applying e. g. electrically external heat thereto up to a temperature below the melting point of its lowest melting component.

Instead of a hard alloy mixture, one of nonrusting steel, or any other chemical or thermal wear-resistant composition may be applied, included those referred to above. Instead of iron metal, copper, or other metals or alloys may be selected for the mandrel which travels through the aperture together with the mixture pressed upon it, whereby the mixture may consist of a composition particularly resistant against wear by electric arcing, as it is advantageous, for instance, for contacts.

What I claim is:

1. A method of manufacturing compact and solid material or bodies of at least two solid substances other than mere lubricants having difference melting points, consisting in heating an unbonded intimate powdery mixture of said substances, so as to render it more dense, intoducing the dense mixture so obtained into an extrusion press, exerting upon said dense mixture a controlled pressure sufficiently high so as to cause lower melting substances present in the mixture to yield and to flow with higher melting still solid substance through the aperture of said press, whereby said mixture is compacted and solidifies.

2. A method of manufacturing compact and solid material or bodies of at least two solid substances other than mere lubricants having different melting points, consisting in agglomerating by heat treatment between and including fritting and presintering temperature an intimate powdery mixture of said substances and introducing it, while still hot, into an extrusion press, exerting upon said agglomerated mixture a controlled pressure sufficiently high so as to cause lower melting substances present in the mixture to yield and to flow with higher melting still solid substance through the aperture of said press, whereby said mixture is compacted and solidifies.

3. A method of manufacturing a compact and solid composite material or body, consisting in heat treating between and including fritting and presintering temperature an intimate powdery mixture of at least two solid substances other than mere lubricants having different melting points upon or into another solid body, thereby agglomerating said metals and said body, introducing the initial composite body so obtained into an extrusion press, exerting upon said initial body a controlled pressure sufficiently high so as to cause lower melting substance present in said initial body to yield and to flow with higher melting still solid substance through the aperture of said press, whereby said mixture and said body are bonded and said agglomerated mixture is compacted and solidifies.

4. A method of manufacturing a compact and solid composite material or body, consisting in heat treating between and including fritting and presintering temperature an intimate powdery mixture of at least two solid substances other than mere lubricants having different melting points upon or into another solid body, thereby agglomerating said metals and said body, introducing the initial composite body so obtained into an extrusion press, exerting upon said initial body while at elevated temperature below the melting point of the lowest melting substance present in said body, a controlled pressure sufficiently high so as to cause lower melting substance present in said initial body to yield and to flow with higher melting still solid substance through the aperture of said press, whereby said mixture and said body are bonded and said agglomerated mixture is compacted and solidifies.

5. A method of manufacturing a compact and solid composite material or body comprising at least two intimately and permanently connected parts, consisting in preparing a coherent first part capable of being deformed when treated in an extusion press, heat treating between and including fritting and presintering temperature thereupon or therein as a second part a mixture of at least two solid substances having different melting points, said mixture covering at least a portion of the surface of said first part, thereby agglomerating said mixture and said first part, introducing the initial composite body so obtained into an extrusion press and exerting upon it a controlled pressure sufficiently high to cause lower melting substance of said agglomerated first and second part to yield and to flow with higher melting substance through the aperture of said press, whereby said parts are bonded, compacted and solidify.

6. A method of manufacturing a composite material or body comprising at least two intimately and permanently connected parts, consisting in agglomerating by heat treatment between and including fritting and presintering temperature a mixture of at least two substances having different melting points upon a solid body not yielding to pressure as exerted in an extrusion press, said mixture covering at least a portion of the surface of said solid body, introducing the initial composite body so obtained into an extrusion press and exerting upon it a pressure sufficiently high to cause lower melting substance of said mixture to yield and to flow with higher melting substance though the aperture of said press, simultaneously causing said solid body to travel with said flowing mixture through said aperture whereby said mixture is compacted and solidifies on said solid body.

7. A method of manufacturing a composite material or body comprising at least two intimately and permanently connected parts, consisting in agglomerating by heat treatment between and including fritting and presintering temperature a mixture of at least two substances having different melting points into a solid hollow body not yielding to pressure as exerted in an extrusion press, said mixture covering at least a portion of the surface of said solid body, introducing the initial composite body so obtained into an extrusion press having a mandrel in its aperture and exerting upon said initial body a pressure sufficiently high to cause lower melting substance of said mixture to yield and flow with higher melting substance through the aperture of said press, simultaneously causing said hollow body to travel with said flowing mixture through said aperture whereby said mixture is compacted and solidifies within and on said solid body.

8. A method of manufacturing compact and solid material or bodies of at least two solid substances other than mere lubricants having different melting points, consisting in primarily agglomerating by heat treatment an unbonded intimate powdery mixture of said substances, the temperature range of said heat treatment lying between and including fritting and pre-sintering temperatures of said mixture, introducing said agglomerated mixture into an extrusion press, and exerting upon said mixture a controlled pressure sufficiently high so as to cause lower melting substances present in the mixture to yield and to flow with higher melting, still solid substances through the aperture of said press, whereby said mixture is compacted and solidifies.

PAUL SCHWARZKOPF.